United States Patent Office 2,971,776
Patented Feb. 14, 1961

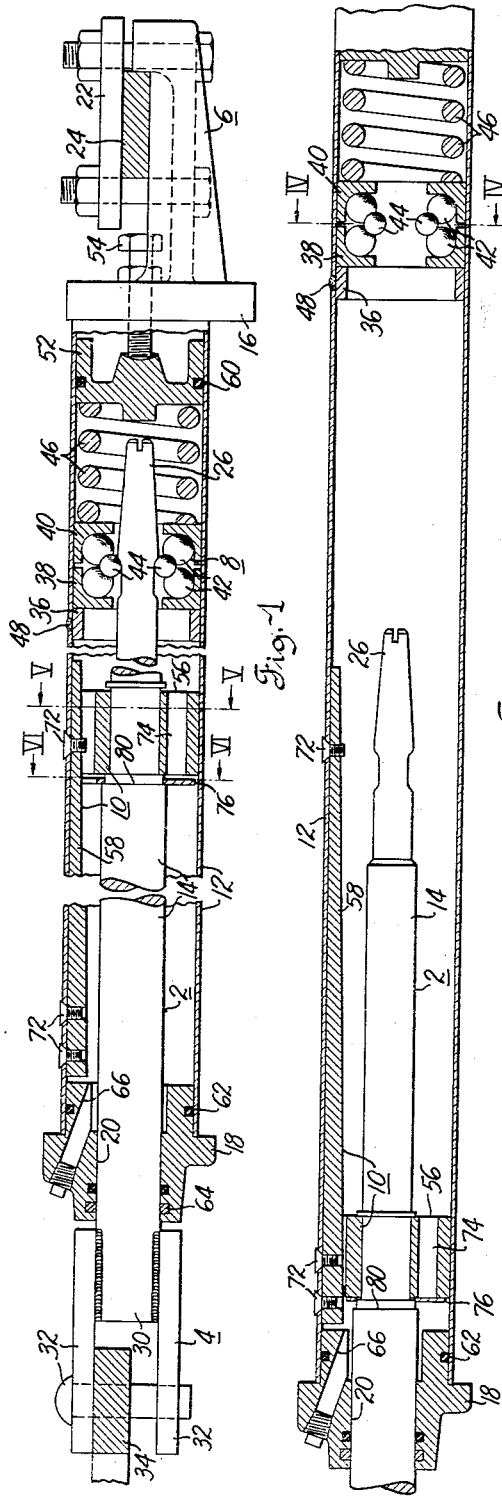
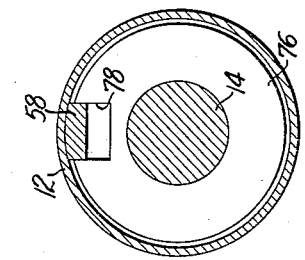
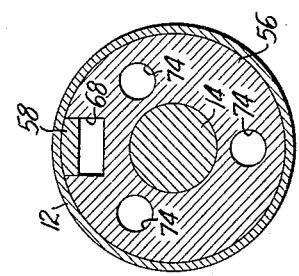
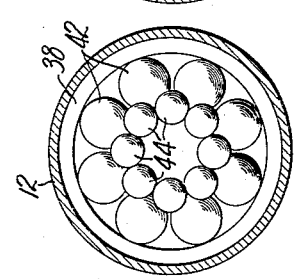
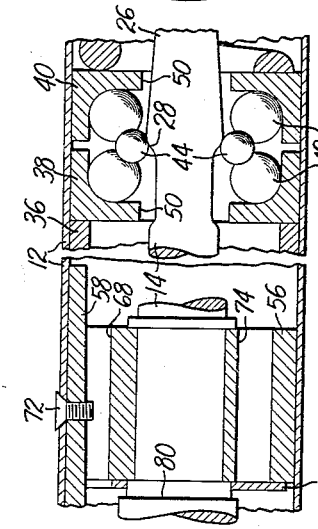

2,971,776
TRACTOR HITCH

Walter G. Charley, La Cresent, Minn., and Robert S. Reaves, Waukesha, Wis., assignors to Allis-Chalmers Manufacturing Company, Milwaukee, Wis.

Filed Oct. 6, 1958, Ser. No. 765,508

4 Claims. (Cl. 280—450)

This invention relates generally to vehicle hitches and more particularly to an improved hitch by which a drawn load such as an agricultural implement can be connected to a tractor or the like.

When a plow or a like agricultural implement is being operated it can encounter an obstruction in the field. If an ordinary hitch is employed which does not yield or separate under overload, the tractor must travel at a low rate of speed in the interest of safety to both the operator and the equipment. Even with these precautions, there is considerable likelihood that the equipment will be damaged by engaging an immovable obstruction such as a stump or a large rock.

Various draft limiting devices have been devised to protect the equipment and safeguard the operator. These devices have taken the form of shear pins, spring release hitches, tractor declutching devices, and various types of extendable cushioning hitches.

One of the disadvantages of prior art hitches is that when an obstruction is engaged the hitch stretches and stores energy like a spring. As a result the hitch tries to pull the implement and tractor back together. This arrangement places all the parts of the hitch under stress. This can be dangerous if an attempt is made to disconnect the hitch while it is in this condition. There is also danger if one of the members connecting the tractor, implement and hitch should break.

However, eliminating the spring arrangement of prior art hitches is not a complete solution. When you eliminate the spring you also lose the advantage that a spring supplies. With a spring arrangement the shock of slowing the tractor is applied gradually and not abruptly. The spring first provides a small resistance to extension and then increases its resistance to extension to provide a cushion effect. This is a very desirable characteristic.

Another disadvantage of prior art hitches is that they employ complicated overload release devices that are difficult to maintain and which break easily.

It is an object of this invention to provide an improved hitch that provides all of the advantages of a spring arrangement, but which remains neutral and does not store energy when it extends so that it is not dangerous.

It is also an object of this invention to provide an improved hitch that can accomplish the above, and which is simple in construction and has few moving parts.

It is also an object of this invention to provide a hitch arrangement wherein dashpot fluid is used to lubricate detent means.

The foregoing and other objects and advantages are obtained by the present invention, various novel features of which will be apparent from the description herein and the accompanying drawings, in which:

Fig. 1 is a sectional view of the tractor hitch in its contracted or normal position;

Fig. 2 is a sectional view of the tractor hitch illustrating the rod of the hitch about to disengage from the detent means, and the valve washer engaging the piston;

Fig. 3 is a sectional view illustrating the tractor hitch in its extended position;

Fig. 4 is a sectional view of Fig. 3 taken in the direction of arrows IV—IV illustrating a portion of the detent means;

Fig. 5 is a sectional view of Fig. 1 taken in the direction of arrows V—V illustrating the piston; and Fig. 6 is a sectional view of Fig. 1 taken in the direction of arrows VI—VI illustrating the valve washer.

*The invention generally*

Referring generally to the drawings, the invention contemplates a yieldable hitch combination which comprises: a contractible and extendible member 2; means 4, 6 connecting said contractible and extendible member 2 to the tractor and the implement; a coupling in the form of detent means 8 to prevent said contractible and extendible member from extending until a predetermined force of separation between the tractor and implement is reached; and cushion means 10 in the form of a dashpot that provides continually increasing resistance to extension of member 2 while dissipating the energy imparted to said cushion means so said hitch is neutral.

*Contractible and extendible member*

Referring more specifically to the drawings, contractible and extendible member 2 which interconnects the tractor and implement, comprises cylinder member 12 and rod member 14. The rod and cylinder are telescopically connected for contraction and extension.

Cylinder 12 includes a head 16 that closes one end, and a head 18 at the opposite end that contains passage 20. Tie rods (not shown) connect heads 16 and 18 together. Head 16 is provided with attaching means 6 in the form of a clamp 22 for attachment to drawbar 24 of a tractor (not shown).

Slidably received in passage 20 in head 18 is rod 14. End 26 of rod 14 is tapered and provided with shoulder 28 (Fig. 2). End 30 is provided with attaching means 4 in the form of pin and yoke connection 32 which attaches to drawbar 34 of an implement (not shown).

*Detent means*

The detent means 8 functions to hold cylinder 12 and rod 14 in their contracted position, but releases them for extending movement if an obstruction is encountered.

The detent means includes: a collar 36; movable means comprising first and second cam members 38, 40 which include cam elements 42, and follower members 44; and, force means in the form of spring 46.

Collar 36 is positioned near the end of cylinder 12 closed by head 16. Collar 36 is rigidly secured, as by spot welds 48, to the inside surface of cylinder 12. The collar acts as a stop or limit means to limit movement of cam member 38.

Each cam member 38, 40 is made annular to provide a passage 50 (Fig. 2) for rod 14. Each cam member has an L-shaped cross section to support a series of cam elements 42, in the form of balls. Cam elements 42 in turn support a plurality of follower members 44 (Fig. 4), also in the form of balls. Follower members 44 are positioned around annular passage 50 in said cam members 38, 40.

Cam elements 42 cooperate with the follower members 44 to urge the follower members 44 radially inwardly into gripping contact with rod 14. Follower members 44 are used to decrease friction between cam members 42 and follower members 44. Although cam members 38, 40 are illustrated as of L-shaped cross section and include cam elements 42, cam elements 42 can be eliminated. In that case cam members 38, 40 would be made with a triangular cross section, with one side of the triangle directly engaging follower members 44.

To bias and hold follower members 44 in engagement with rod 14, force means in the form of a compression spring 46 is interposed between second cam member 40 and an adjustable plug 52 carried by head 16. Spring 46 urges second cam member 40 toward first cam member 38. Means in the form of a bolt 54 is provided to move the plug relative to collar 36 to vary the pressure that spring 46 applies on cam member 40.

Cushion means

Cushion means cushions the tractor from the impact of the implement striking an immovable object and slows the tractor down. The cushion means comprises piston 56 and tapered member 58.

Rod 14 carries piston 56. To retard the movement of piston 56, cylinder 12 is filled with hydraulic fluid so as to form a dashpot. Suitable O-rings 60, 62 (Fig. 1) and packing material 64 are provided to maintain a fluid tight seal. A fluid port 66 is also provided in head 18 for addition or removal of fluid. Piston 56 (Fig. 5) is provided with square opening 68 for passage of fluid.

Means in the form of a tapered member 58, which is illustrated as square, is provided for continuously decreasing the size of opening 68 in piston 56 when rod 14 extends relative to cylinder 12. This decreases the flow of hydraulic fluid through opening 68 and causes piston 56 to provide continually increasing resistance to extension of rod 14. The energy imparted to said hitch is converted to heat as the fluid flows through opening 68 in said piston, so the hitch is always neutral.

Tapered member 58 is rigidly secured by means in the form of screws 72 to the inside surface of cylinder 12. The tapered member extends longitudinally of said cylinder and through opening 68 in piston 56.

Rehitching

An arrangement is provided to facilitate quick rehitching of the tractor and implement. Piston 56 is provided with three circumferentially spaced holes 74. Slidably mounted on rod 14 for axial movement therealong is a valve washer 76 containing a square opening 78. The valve washer is movable between shoulder 80 (Fig. 2) on rod 14 and piston 56. When the hitch extends (Figs. 2 and 3) the valve washer covers the three holes 74 so fluid can only flow through square openings 68, 78 in the piston and washer. In returning the hitch to its retracted position the valve washer moves against shoulder 80 (Fig. 1 and uncovers holes 74 so fluid can flow through them to permit rapid rehitching.

Operation

When a predetermined force of separation is reached between cylinder 12 and the rod 14, as determined by the pressure of spring 46, rod 14 moves to the left (as viewed in Fig. 1). Shoulder 28 (Fig. 2) of rod 14 causes follower members 44 to move radially outward. The follower members spread apart the annular cam members 38, 40 against the pressure of spring 46. This releases rod 14 with associated piston 56 for movement relative to cylinder 12.

When the hitch starts to extend, the pressure of the hydraulic fluid moves valve washer 76 until it contacts piston 56. The valve washer closes the three holes 74 in piston 56 to the flow of hydraulic fluid. In this manner the hydraulic fluid is made to pass through square openings 68, 78 in piston 56 and washer 76.

As piston 56 moves relative to cylinder 12, the size of the tapered member 58 increases gradually reducing the size of the effective opening 68 in the piston. This results in a snubbing or throttling action to movement of the piston relative to the cylinder. This slows the tractor down with the least amount of shock.

In returning the hitch to its normally contracted operating position, the tractor is backed up. This causes piston 56 to move in a rearward direction (to the right as viewed in Fig. 3). The resulting fluid pressure moves valve washer 76 away from piston 56 and uncovers the three holes 74. Hydraulic fluid flows through the three holes in the piston thereby offering little resistance to relatching of the hitch.

Reengagement of rod 14 with coupling means 8 is easily accomplished due to the gradual taper of end 26 of the rod.

It is noted that coupling means 8 is completely exposed to the hydraulic fluid and is lubricated thereby. As a result this hitch requires very little maintenance.

It is further noted that although the cylinder is indicated as connected to the tractor, the position of the rod and cylinder can be reversed.

In summary this invention provides:

(1) A hitch arrangement that provides all the advantages of a spring arrangement, but which remains neutral and does not store energy when it extends so it can be released from the implement or the tractor in any position without danger to the operator, implement or tractor;

(2) A hitch arrangement which contains few moving parts and is extremely simple; and (3) A hitch arrangement wherein the detent means and cushion means can be contained within a single tube so the hydraulic fluid can be used to lubricate the detent means, thereby providing a hitch that requires little maintenance.

It should be understood that it is not intended to limit the invention to the herein disclosed form but that the invention includes such other forms and modifications as are embraced by the scope of the appended claims.

What is claimed is:

1. In a yieldable hitch for interconnecting a tractor and an implement, the combination comprising: a contractible and extendible member having opposite ends; means connecting one end of said member to said tractor; means connecting the other end of said member to said implement; releasable nonenergy storing detent means connected to, and cooperating with said member, said detent means including movable means and force means, said movable means being moved by said force means to a position preventing said member from extending until a predetermined force of separation between said implement and tractor is reached, said force means in response to movement of said member, storing energy when said member is contracted and giving up said energy when said member extends; and, cushion means connected to, and cooperating with said member, said cushion means providing continually increasing resistance to extension of said member while dissipating the energy imparted to said cushion means so said hitch is neutral.

2. In a yieldable hitch for interconnecting a tractor and an implement, the combination comprising: a cylinder filled with hydraulic fluid; said cylinder having one end closed and a passage in the other end; a rod extending through said passage and carrying a piston movable in said cylinder; means connecting said cylinder to said tractor; means connecting said rod to said implement; a first cam member carried within said cylinder; means limiting movement of said first cam member away from said closed end of said cylinder; a second cam member positioned between said first cam member and the closed end of said cylinder; said cam members being provided with openings for passage of said rod, a plurality of follower members positioned between said first and said second cam members, said rod when in retracted position having a portion which is engaged by said follower members; a spring, one end of said spring engaging said second member and the other end of said spring reacting against the closed end of said cylinder; said spring urging said second cam member against said follower members to in turn cam said follower members radially inward; said end of said cylinder which is closed including means to vary the force exerted by said spring on said second cam member so as to vary the pressure that said follower members apply against said rod; said piston carried by said rod including an opening for passage of said hydraulic fluid; a tapered member extending longitudinally of said cylinder; and, means connecting said tapered member to the inner surface of said cylinder so that said tapered member extends through said opening in said piston, said tapered member continuously filling said opening in said piston when said rod member extends relative to said cylinder member.

3. In a yieldable hitch for interconnecting a tractor and an implement, the combination comprising: a rod member and cylinder member telescopically connected for relative movement between a contracted and extended position; means connecting one of said members to said tractor; means connecting the other of said members to said implement; releasable nonenergy storing detent means connected to, and cooperating with one of said members to prevent the other of said members from extending until a predetermined force of separation between said implement and tractor is reached, said detent means including a first cam carried within said cylinder member, means connected to said cylinder member to limit movement of said first cam; a second cam carried within said cylinder member and opposing said first cam, said cams containing openings to provide passage for said rod member, a plurality of followers positioned between said first and second cams and, force means reacting between said cylinder member and said second cam carried within said cylinder member, said force means acting on said second cam to cam said followers radially inwardly to hold said rod member when said members are contracted; and, a hydraulic cushion means also carried within said cylinder member and interconnecting said two members, said cushion means in response to extension of said two members providing continually increasing resistance to said extension while dissipating the energy imparted to said cushion means so that said hitch is neutral.

4. A device as set forth in claim 3 wherein said cylinder member is provided with means to vary the force exerted by said force means on said movable cam.

References Cited in the file of this patent
UNITED STATES PATENTS

| | | |
|---|---|---|
| 2,102,722 | Kortering | Dec. 21, 1937 |
| 2,541,356 | Hansmann | Feb. 13, 1951 |

FOREIGN PATENTS

| | | |
|---|---|---|
| 1,087,701 | France | Feb. 28, 1955 |
| 576,274 | Great Britain | Mar. 27, 1946 |